United States Patent [19]

Olivier

[11] 4,248,715
[45] Feb. 3, 1981

[54] ELECTROLYTIC CHLORINE GENERATOR

[76] Inventor: Paul D. Olivier, 4851 E. Fanfol Dr., Scottsdale, Ariz. 85253

[21] Appl. No.: 97,048

[22] Filed: Nov. 23, 1979

[51] Int. Cl.³ .................... C25B 9/00; C25B 13/04; C25B 1/26

[52] U.S. Cl. .................... 204/260; 204/266; 204/295; 204/128

[58] Field of Search .................... 204/260, 263–266, 204/295, 128

[56] References Cited

U.S. PATENT DOCUMENTS

| | | | |
|---|---|---|---|
| 1,012,808 | 12/1911 | Bull | 204/149 X |
| 1,080,826 | 12/1913 | Gibson | 204/152 |
| 1,277,378 | 9/1918 | Case | 204/228 |
| 2,163,793 | 6/1939 | Logan | 204/260 X |
| 2,228,264 | 1/1941 | Freedley | 204/266 |
| 2,363,386 | 11/1944 | Bock | 204/260 X |
| 2,427,433 | 9/1947 | Winslow et al. | 204/263 X |
| 3,102,085 | 8/1963 | Edwards et al. | 204/266 X |
| 3,351,542 | 11/1967 | Oldershaw et al. | 204/149 |
| 3,458,414 | 7/1969 | Crane et al. | 204/149 |
| 3,563,879 | 2/1971 | Richards et al. | 204/272 |
| 3,719,531 | 3/1973 | Dzieciuch et al. | 240/295 X |
| 3,736,322 | 5/1973 | Helber et al. | 204/266 |
| 3,801,488 | 4/1974 | Okuhara et al. | 204/260 X |

FOREIGN PATENT DOCUMENTS 615619  7/1935  Fed. Rep. of Germany.

*Primary Examiner*—Howard S. Williams
*Assistant Examiner*—D. R. Valentine
*Attorney, Agent, or Firm*—Warren F. B. Lindsley

[57] ABSTRACT

An electrolytic chlorine generator employing a porous ceramic diaphragm for separating strong caustic solutions existing on one side of a cylindrical diaphragm from weak acidic solutions on the other side thereof without deterioration and wherein the anode and cathodes are rings placed concentrically with the diaphragm and in close proximity to it.

13 Claims, 5 Drawing Figures

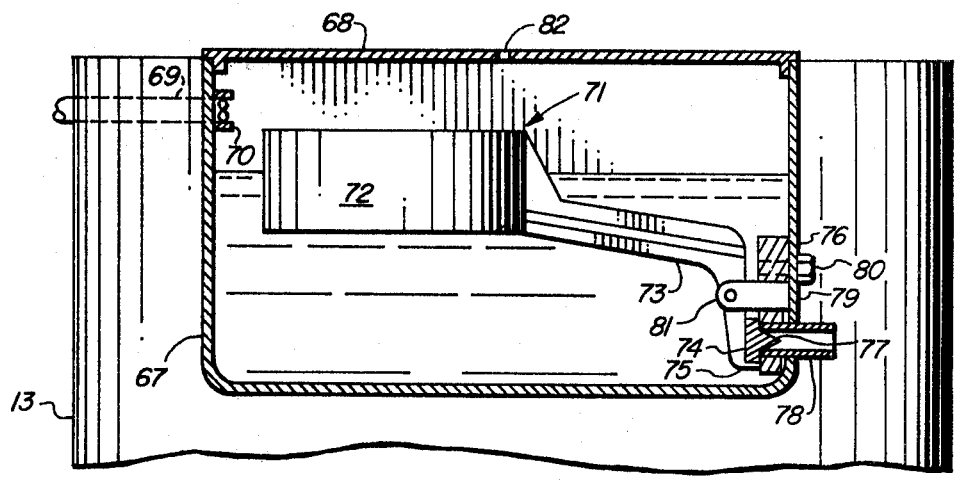
FIG-2
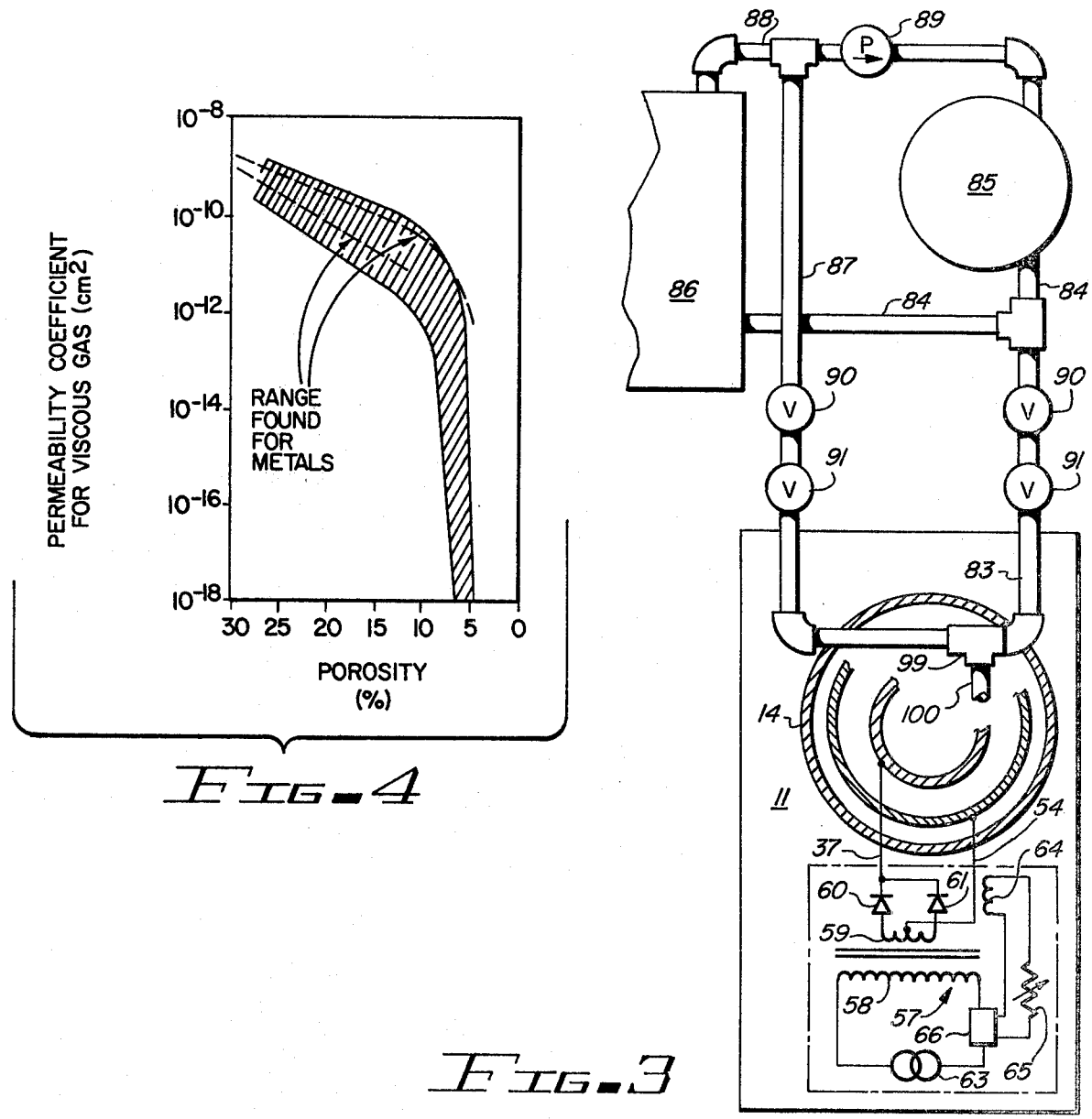
FIG-4
FIG-3

ELECTROLYTIC CHLORINE GENERATOR

BACKGROUND OF THE INVENTION

The maintenance of a private swimming pool especially in regard to the chemistry involved in a complex, time-consuming and expensive routine when handled in the conventional manner.

During the warmer season in particular, the water must be checked almost daily to determine the pH level and the chlorine content. Unless these factors are carefully controlled, the growth of bacteria and algae in the pool will be excessive with the result that a hazard to health is produced. In addition, the waer and the surfaces of the pool become discolored and unsightly. To maintain the required pH level, frequent addition of acid is required. The chlorine is added chemically, typically in the form of sodium hypochlorite. Because the chlorine can only be added intermittently by this method, a compromise must be accepted in terms of the instantaneous chlorine level with an undesirably high level experienced after the chlorine is added and an undesirably low level existing just prior to the addition. In the interest of producing a leveling effect, certain stabilizing chemicals are added which delay the release of the chlorine, hopefully with an economy realized because of the increased total effectiveness of the chlorine added. Very often, however, the stabilizer builds up excessively producing a condition known as "chlorine lock" in which the chlorine is tied up and not available as an oxidizing agent. This and other conditions require special corrective procedures. In addition, "shock treatments" involving super-chlorination are required periodically to destroy certain types of algae which develop resistance to the relatively constant lower level of chlorination. Algaecide inhibitors are also recommended along with the "shock treatments."

The foregoing routines are expensive and time consuming and they tend to bewilder the average pool owner. If he fails to follow the proper procedures faithfully, corrective measures must be taken which are even more expensive in the long run because of the resulting deterioration of the pool itself.

In addition to the foregoing disadvantages of the conventioanl chlorination procedures employed by the typical home pool owner, the special chemicals added over and above the chlorine itself produce undesirable effects on the pool walls and on clothing and they are irritating to the skin, eyes and sinuses of those using the pool.

It is recognized that a more desirable result in terms of pool chemistry may be realized if chlorine is introduced as a gas directly into the water rather than in combination with other chemicals. This method is utilized by professional pool maintenance operators, especially in connection with the treatment of the larger public pools. Because of the hazards involved in the handling of the pressurized tanks of chlorine gas and because of the toxicity of the gas, however, this method has not been widely applied in the case of the smaller private pools.

This invention relates to electrolytic chlorine generators and more particularly to the porous structure for separating the sodium hydroxide solution from the acidic brine solutions formed during the formation of chlorine gas as well as to the geometrical configuration of the anode, separator, and cathode.

DESCRIPTION OF THE PRIOR ART

Chlorine generation systems, suitable for use in the treatment of private pools are available commercially, one of which is described in U.S. Pat. No. 3,458,414 (Crane and Stevens) but the initial and operating costs of such systems have been excessive.

U.S. Pat. No. 1,012,808 discloses a means for purifying water wherein a solution of an iron compound capable of precipitation to form the coagulating agent is provided which includes electrolysis in the production of iron solvent.

U.S. Pat. No. 1,080,826 discloses a heating and purifying water system for the preparation of water for boilers.

U.S. Pat. No. 1,277,378 discloses a sterilizing apparatus and moe particularly the automatic addition of a purifying chemical to a liquid in proportion to the amount of liquid flow.

U.S. Pat. No. 2,228,264 discloses an electrolytic cell adapted to produce chlorine, a salt saline sodium hydroxide solution and hydrogen from a solution of sodium chloride.

U.S. Pat. No. 3,351,542 discloses an electrolytic chlorination and pH control for swimming pool water wherein both chlorine and hydrochloric acid are introduced into the swimming pool water at a predetermined rate.

U.S. Pat. No. 3,563,879 discloses an electrolytic chlorine generator which utilizes the pressure of the chlorine generated for discharging chlorine gas into a water line of a swimming pool.

The German Pat. No. 615,619 dated July 9, 1935, merely discloses a float arrangement in a water containing chamber.

There is no teaching in any of these patents of the particular electrolytic cell disclosed and claimed herein.

SUMMARY OF THE INVENTION

The development of a ceramic diaphragm for use in electrolytic chlorine generators has been given serious consideration for some time. The optimum characteristics for such a device must have an unusual set of properties. It must be chemically resistant to its environment and possess permeability characteristics with very small pores. Mechanical strength is only of secondary consideration.

Porous ceramics of various types have been used for many years as filters; however, the pore size required for electrolytic processes require much smaller pores than is desirable as a filter in other processes.

Chemical inertness in electrolytic chlorine generators is of obvious prime importance. Strong caustic solutions exist on one side of the diaphragm while weak acidic solutions exist on the other and the temperature is below the boiling point of water.

To be used as a barrier or diaphragm in a chlorine cell, the ceramic material must display a high degree of inertness toward its environment and the manufacturing techniques of the ceramic must provide the needed physical characteristics.

Alumina—($Al_2O_3$) is one of the most stable of compounds and free molecular hydrogen does not reduce it at any temperature. Some metals react with alumina at elevated temperatures which are well above consideration for this application. Hot concentrated sulfuric acid and its bisulfates attack alumina, but this is not a problem since hot $H_2SO_4$ does not exist in the environment of the chlorine generator disclosed. Hot concentrated hydrochloric acid only attacks alumina to a very minor degree and the intensity of attack decreases with decreasing temperature. At room temperature little effect is noted on sintered alumina. Operation of chlorinators are in the temperature range below the boiling point of the solutions used and only weak concentrations of HCl exist and comprise no material deteriorating problem.

Dry chlorine has no chemical influence on alumina in the sintered form at any temperature. Alumina does react to some degree with water vapor, but this too is far above the range of consideration for this application.

Hot water solutions of free alkali and of carbonates cause some attack on sintered alumina, forming a soluble alkali aluminate and hot solutions of sodium hydroxide are known etchents for alumina microstructure. At temperatures below 130° F. weak concentrations of sodium hydroxide have little adverse effect on the microstructure and tests using alumina as a separator in a chlorine diaphragm cell show no visible deterioration.

The diaphragm to be effective must be used in conjunction with an anode and a cathode. The geometric configuration of these elements plays an important part in the overall performance of the system. It is well known that the distance between the anode and the cathode is of prime importance. Tests have shown that for batch processed cells, those in which a fixed quantity of salt and water are contained until the electrolytic process is completed, a configuration in which the diaphram is a cylinder and the anode anc cathode are rings placed concentrically with the diaphragm in close proximity to it is desirable.

In accordance with the invention claimed, an improved electrolytic chlorine generator is provided for commercial and home use which utilizes a porous ceramic diphragm or basket for separating a sodium hydroxide solution from the resulting acidic solution during and after the generation of chlorine gas from this solution.

It is, therefore, one object of this invention to provide a new and improved electrolytic chlorine generator.

Another object of this invention is to provide an improved porous diaphragm or basket for holding the salt brine separate from the resulting basic solution without interfering with the electrolytic action necessary to generate chlorine gas.

A further object of this invention is to provide a new and improved diaphragm or basket formed out of porous ceramic material.

A still further object of this invention is to provide an improved porous ceramic material for the separator needed in an electrolytic chlorine generator.

A still further object of this invention is to provide a ceramic separator material for an electrolytic generator having a particular range of pore sizes.

A still further object of this invention is to provide an improved geometric configuration for a diaphragm used in conjunction with an anode and cathode.

A still further object of this invention is to provide a new and improved configuration for the anode, separator, and cathode for the generation of chlorine in an electrolytic cell.

A still further object of this invention is to provide a new and improved chlorine generating apparatus in which the diaphragm separating ring anode and cathodes is of a cylindrical configuration.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawings, in which:

FIG. 2 is a side view partly in section of the chlorine generator shown in FIG. 1;

FIG. 3 is a diagrammatic representation of the invention as connected with the filtration system of the pool; and FIG. 4 is a graph illustrating the permeability coefficient for viscous gas flow in porous ceramic materials.

DESCRIPTION OF THE PREFERRED EMBODIMENT

Figure 1:
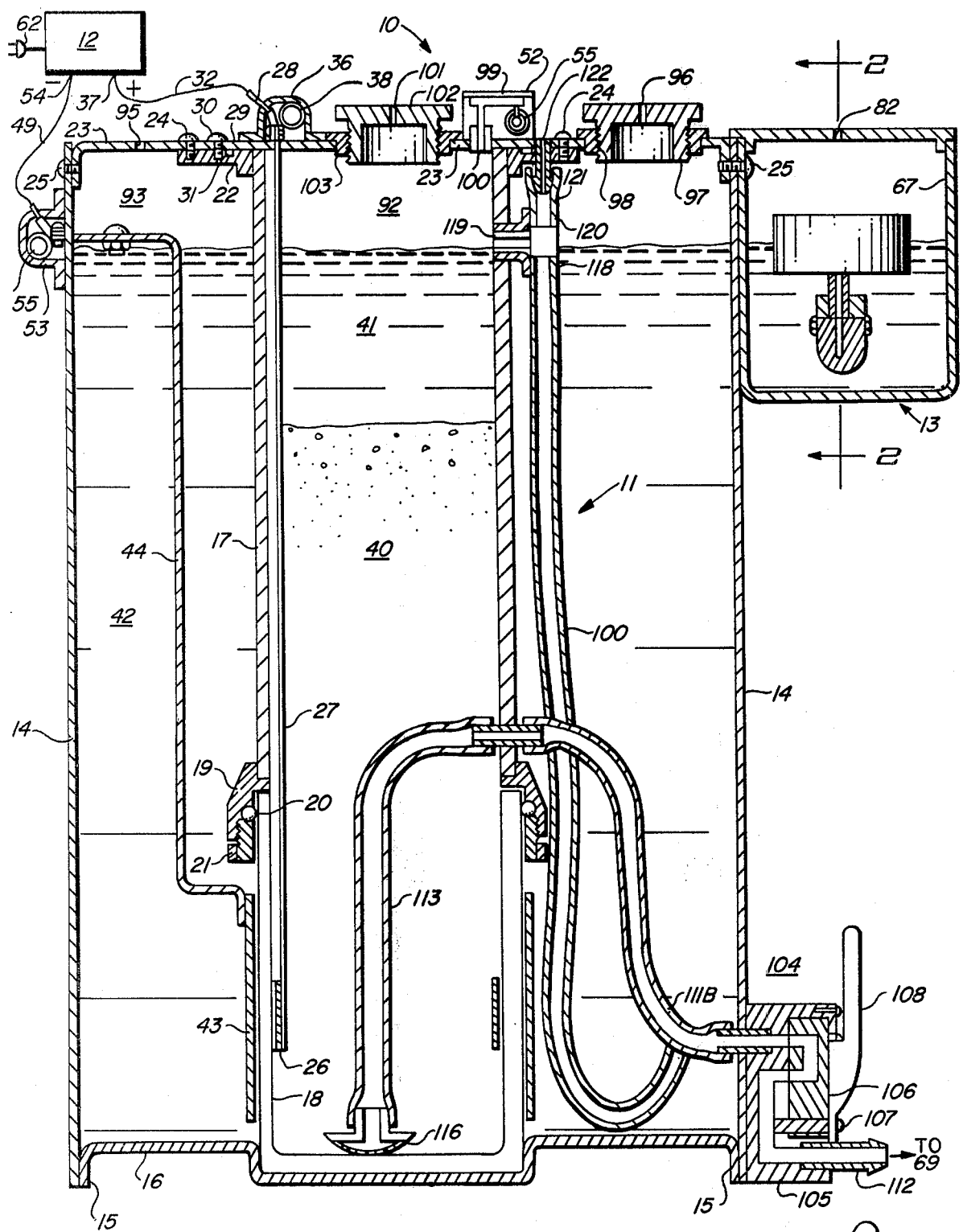
FIG. 1 is a diagrammatic illustration of a chlorine generator employing a ceramic cylinder and embodying the invention.
Figure 1A:
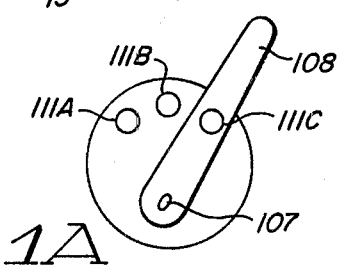
FIG. 1A is a front view of the selection valve shown in FIG. 1.

Referring more particularly to the drawings by characters of reference, FIGS. 1-3 disclose an improved chlorination system 10 especially devised for use in the purification of swimming pools, the system comprising an electrolytic chlorine generator 11 with its associated power supply 12 and mixing chamber 13.

The chlorine generator 11 is modeled after the Hooker diaphragm cell, the principles of which are well known in the art, but the special construction of the generator 11 is adapted to meet the particular needs of the invention. The generator 11 comprises an upright cylindrical outer wall 14, its lower end cemented to the vertical flange 15 of a horizontal base plate 16. An upright cylindrical inner wall 17 concentric with outer wall 14 having a diameter approximately one-third that of outer wall 14 is connected to a porous ceramic cylindrical cup 18, having pores of a given size as hereafter explained, of approximately the same diameter as inner wall 17 by flange 19 sealed by O-ring 20 and packing nut 21. Cylindrical cup 18 fits inside a recess in base plate 16 for lateral support. Flange 22 cemented to the upper end of cylinder 17 provides a means of attachment to a horizontal cover plate 23 by screws 24. Cover plate 23 is fitted inside outer wall 14 and supported atop inner wall 17 which is slightly shorter than outer wall 14 by screws 25.

A cylindrically coated expanded metallic ring shaped anode 26 is concentrically centered within and in close proximity to porous cylindrical ring or cup 18 and supported by conductor strap 27 to which it is secured by welding. Conductor strap 27 passes through a slot in cover plate 29 which is attached to flange 22 by screws 30 and sealed by a ring 31. Conductor strap 27 is suitably connected to electrical conductor 32 which passes through a hole in terminal cover 36 to positive terminal 37 of power supply 12. A conduit 38 for cooling water also passes through cover 36. The terminal connection of electrical conductor 32 and cooling conduit 38 are encapsulated in epoxy within cover 36 and cemented to cover 29. A quantity of rock salt 40 is contained within inner wall 17 with a quantity of water making a slat brine 41 which may have some disolved chlorine and caustic soda contained between inner and outer walls 17 and 14, respectively.

A cylindrical perforated metal cathode 43 is concentrically centered outside and in close proximity to porous ceramic cup 18, and is supported by conductor strap 44 to which it is secured by welding. Conductor strap 44 is suitably attached to conductor strap 45 which passes through a slot in outer wall 14. Conductor strap 45 is suitably connected to electrical conductor 49 with conductor 49 passing through a hole in terminal cover 53 to negative terminal 54 of power supply 12. A conduit 55 for cooling water passes through cover 53 with the terminal connection and cooling conduit 55 encapsulated in epoxy within cover 53. Cover 53 is cemented to outer wall 14.

The power supply 12, as illustrated in FIGS. 1 and 3, comprises a step-down transformer 57 having a primary winding 58 and a center-tapped secondary winding 59, rectifier diodes 60 and 61, input power cord 62 and output electrodes 37 and 54. The diodes 60 and 61 have their cathodes connected to positive electrode 37. The anode of diode 60 is connected to one end of secondary winding 59 and the anode of diode 61 is connected to the other end of winding 59. The centertap of winding 59 is connected to negative electrode 54. When the primary winding 58 is connected to a source of alternating current voltage 63 by means of cord 62 a positive output voltage is developed at electrode 37 relative to electrode 54.

Current coil 64 produces a voltage proportional to the output current. This voltage is modulated by variable resistor 65 and fed into voltage regulator 66.

The mixing chamber 13 shown in more detail in FIG. 2 comprises an upright cylindrical plastic container 67 covered by a plastic lid 68 secured in place by a close fit. An inlet tube 69 penetrates the vertical wall of container 67 and is secured therein by means of a retainer 70. Outlet flow from mixing chamber 13 is controlled by float valve assembly 71 comprising float 72 and an inclined pivot arm 73 with rubber valve plug 74 secured to pivot arm 73 by retainer 75 which is cemented to pivot arm 73. Valve body 76 provides the base for mounting and the valve seat 77 in the outlet pipe 78. Valve assembly 71 is attached to the vertical wall of chamber 67 against gasket 79 by bolt 80.

Pivot arm 73 is pivotally attached to the top of valve body 76 by means of a pivot pin 81. When float 72 is not buoyed upwardly by water its weight tilts lever 73 downwardly causing plug 74 to pivot in a counter clockwise direction about pin 81 and causing plug 74 to bear against the valve seat in pipe 78 to block the flow of water thereinto. Rising water inside container 67 lifts float 72 and moves plug 74 away from valve seat 77 thus permitting the exhausting of water through outlet pipe 78 and thereby regulating the level of contained water. Vent hole 82 in cover 68 allows any intrained air to escape.

As shown in FIG. 3, water from the swimming pool passing through the filter system plumbing, including pipe 88, filter 85 and pipe 84, enters inlet pipe 83 of generator 11 through a tap into filter outlet pipe 84 which pipe carries the water from filter 85 back to pool 86. Water passing through generator 11 returns through outlet pipe 87 back into filter inlet pipe 88, filter 85 and back into the pool through pipe 84. The pool filter pump 89 which is connected into pipe 88 circulates pool water through filter 85 and thereby creates a pressure differential between filter inlet and outlet pipes 84 and 88. The pressure differential thus created induces a desired flow of pool water through generator 11 via pipes 83 and 87, the gate valves 90 permitting isolation of the chlorination system for maintenance and repair and the check valves 91 preventing reverse water flow under abnormal conditions.

The operation of the total chlorination system 10 occurs as follows:

Electrical current flowing from positive electrode 37 of power supply 12 passes through conductors 32 and strap 27 to anode 26, from anode 26 through brine solution 41, through the pores in the wall of cup 18 to cathode 43 and thence through conductors 44 and 49 to negative electrode 54 of supply 12. The current passing from anode 26 to cathode 43 produces an electrolytic reaction in the brine solution 41 which involves the production of chlorine gas 92 at the anode 26 and the simultaneous collection of hydrogen and sodium hydroxide (caustic soda) at the cathode 43. The ceramic inner wall of cup 18 separates and isolates the chlorine from the hydrogen and the salt brine from the sodium hydroxide to prevent recombination. The brine solution 41 is maintained at a saturated level by a charge of sodium chloride 40 contained within wall 17 and surrounding anode 26.

The hydrogen gas 93 generated at the cathode 43 rises to the surface of the caustic soda 42 and is discharged to the atmosphere through vent hole 95 in cover plate 23 and through vent hole 96 in fill cap 97. Fill cap 97 is screwed into bushing 98 which is cemented to cover 23.

The chlorine gas generated at anode 26 rises to the surface of brine 41 and is drawn into syphon pump 99 through pipe 100 by venturi effect where it is mixed with water and is carried through tube 96 into mixing chamber 13 where further mixing occurs due to turbulence inside container 67. The water also passes through conduit 38 in cap 36 and conduit 55 in cap 53 providing cooling for the terminals respectively therein. The chlorinated water then leaves container 67 via outlet pipe 78 and is carried by pipe 87 to pump 89 and thence to the swimming pool. Ideally, the pump 89 operates continuously and a continuous and constant supply of free chlorine is thus delivered to the pool. The rate of chlorine generated and delivered to the pool may be controlled by any of a number of means including control of the voltage supplied by power supply 12 or by cycling power supply 12 on and off at an adjustable duty cycle. A means for adjusting the power supply voltage is suggested by the illustration of the current coil 64 and variable resistor 65 with voltage regulator 65 controlling the primary winding 58 of transformer 57. Corresponding to each given current a given rate of chlorine generation will be produced.

A vent 101 in the center of fill cap 102 which is screwed into bushing 103 and cemented into cover 23 of generator 11 and a vent 82 in the top of container 67 enhance the venturi action involved in the transfer of chlorine gas through tube 100 by relieving the vacuum developed over brine solution 41 and the pressure head developed over the chlorinated water in container 67.

In normal operation, the only maintenance required is the emptying of the generator periodically, and the addition of a new supply of salt and water. This is accomplished by manipulation of valve 104, which is comprised of valve body 105, a rotatable selector segment 106 which pivots about pin 107 by a handle 108. Also a part of the valve 104 comprises a multitude of inlet ports 111A–111C, one for each selectable port and an outlet pipe 112.

One of the three selectable ports is connected through one of the three inlet pipes 111A (not shown)

through the wall of chamber 14 and to the space between chamber 14 and inner wall 17 for draining of the sodium hydroxide solution 42. A second inlet pipe 111B is connected through wall 17 and pipe 113 to strainer 116. This port is for draining off the brine solution. A third inlet pipe 111C (not shown) is connected to tube 100 and in turn through tee 118 to pipe 119 which penetrates and is cemented to wall 17. Tube 120 and pipe 121 provide vent 112 for this overflow drain.

Water may move through the mixing chamber 13 at the rate of 20 gallons per hour. This rate is sufficiently high to produce a relatively low chlorine content in the circulated water, thereby preventing the gas from attaching the metal parts of the pump 89.

As shown in the drawings, the walls 18 forming the salt holding diaphragm or basket comprise a porous ceramic material having a predetermined pore size for the electrolytic process disclosed but much smaller than the pore sizes required for filters in other processes.

Microscopic examination of pure sintered alumina after treatment with hot sodium hydroxide solutions show that grain boundaries thereof are attacked by the solutions leaving thin grooves between the pores. This data shows that the grain boundaries are somewhat lower to chemical resistance than that of the crystallites themselves. This phenomenon is somewhat a mystery since for pure alumina no "glass-phase" or binder is present. This may be attributed to the fact that during sintering most impurities move to the grain boundaries thus leaving the crystals more pure than the boundaries. In general, contaminations are more susceptible to chemical attack than the pure dense alumina itself. A second reason for this phenomenon may be that the layers do not entirely belong to the two neighboring grains, but in some way to both of them and are therefore subject to internal stresses. Accordingly, it must be more susceptible to any kind of external attack than the inner part of the grain itself.

In any event, the fact remains that the external attack is present mostly at the boundaries leaving grooves of a size smaller than the grains. Until the attack has proceeded to loosen a grain completely from all surrounding grains, this attack only serves to slightly increase porosity, which for this application is not an undesirable property.

It should be noted that the chemical environment of the barrier between the cathode and the anode in a chlorine cell has on the cathode side, a warm sodium hydroxide solution of 1.0–14 percent concentration which has the potential of attacking the grain boundaries. On the anode side, a saline solution exists containing a gaseous chlorine and dissolved chlorine and some hydroxide ions in a weak acidic solution to which alumina is known to be inert. Thus, the catholite surface is the only one in contact with the known etchent.

Because of its relative availability and projected inertness to the environment of a batch processed cell at low temperatures, alumina is the most desirable material for use as a diaphragm in an electrolytic chlorine generating system. If the purity of the alumina is kept as high as possible to reduce the grain boundary attack by the sodium hydroxide solution, 99.7–99.8 percent, alumina is the best product known for the diaphragm use. Silica is the most common impurity in commercially available alumina and is most readily attacked by sodium hydroxide. It is obvious, therefore, that the lowest amount of silica possible in the ceramic material is desired. The most desirable chemical composition of the alumina disclosed for use in the chlorine generator described is 99.7% $Al_2O_3$; 0.1% $MgO$; 0.1% $Na_2O$; and traces of $SiO_2$ and $CaO$.

Other materials can be considered for use where higher temperatures and concentrations of the catholite sodium hydroxide are present. Magnesium oxide (MgO), being a weak base, is generally not attacked by basic substances, such as alkalis, and alkali carbonates, even in prolonged action in the molten state. Conversely, sintered magnesia is not stable in contact with acidic substances and materials. All concentrated mineral acids dissolve or corrode sintered magnesia at room temperature, although this would not pose a concern for this application. Acid halogens, i.e., hydrochloric and hydroflouric acids, are not particularly aggressive with respect to magnesia. Magnesia is inert to hydrogen and chlorine at low temperatures.

A mixture of alumina and magnesia called magnesia-alumina spinel $Mg(AlO_2)_2$ can be considered as a magnesium salt of meta-aluminic acid and used as the diaphragm in this application. It is not appreciably attacked by cold concentrated mineral acids, and even boiling acids and moderate concentration such as hydroflouric acid is without influence on the walls of sintered spinel. Being a salt of aluminic acid, it can be considered chemically more "saturated" than both components—magnesia and alumina. Therefore, it is consistent that basic substances will attack spinel to a lesser degree than alumina. Molten caustic alkalis and alkali carbonates do not react with sintered spinel.

Calcinated magnesia and calcinated alumina are "alloyed" in molecular proportion 1:1, i.e., 28.2% magnesia and 71.8% alumina by weight are mixed in a ball mill to form spinel. Methods of molding and forming spinel are quite similar to those of molding alumina.

The mechanical properties of spinel are somewhat inferior to those of alumina. Its resistance to thermal shock is poor and its brittleness should be given careful consideration. However, for the application under consideration, these characteristics are of minor consequence.

The production cost of spinel ware, particularly on a small scale, are considerably higher. For commercial chlorinators where higher operating temperatures and caustic concentration are present, magnesia-alumina spinel would be a preferable choice where long life is important.

Ceramic Microstructure

The usual processing of ceramics crystalline or noncrystalline powders is to compact and then to fire them at temperatures sufficient to develop their useful properties. During the firing process changes may occur initially due to the decomposition or phase transformations. Further heating of the fine-grained and porous compacted powder cause one or more of the following changes to occur: an increase in grain size, a change in pore shape and a change in pore size and number occur resulting in a decrease in porosity. In many ceramics solid-state reactions occur forming new phases, polymorphic transformations, and decomposition of crystalline compounds as well as a variety of other changes.

Primary recrystallization is a process that has as its driving force the increased energy of a matrix which has been plastically deformed. The energy, although small, is sufficient to change grain boundary movement and grain size.

Although primary recrystallization is common in metals, most ceramic materials are seldom plastically deformed during processing. Aluminum oxide and magnesium oxide, however, undergo a process called polygonization which has many of the characteristics of primary recrystallization. When a crystal is plastically deformed and then annealed, some of the dislocations introduced by the deformation process tend to line up in low angle grain boundaries. These dislocations occur in connection with grain growth.

Whether or not primary recrystallization occurs, an aggregate of fine-grain crystals increases in average grain size when heated at elevated temperatures. If the average grain size increases, some of the grains must shrink and even disappear from a conservation of mass viewpoint. For this to occur, the energy difference between larger-grained size material and small-grained material must be the driving force. In addition, the interference energy is associated with the boundary between individual grains, and further by the change in free energy across the curved surfaces. The difference in free energy of material on two sides of a grain boundary cause the boundary to move toward its center of curvature. The rate at which the boundary moves is proportional to its curvature and the rate at which the atoms can cross the boundary.

If all the grain boundaries are equal in energy, they meet to form angles of 120° on a two dimensional basis. This obviously occurs with grains of six sides. Grains with fewer than six sides have concave sides with respect to the center of curvature, and thus grow smaller during firing. Conversely, grains with more than six sides tend to grow larger.

Grain growth can be altered by inclusions present in the base material. The inclusions change the grain boundary. Grain boundary energy is decreased with increasing inclusion size and number. Inhibition of grain growth by solid second phase inclusions can be accomplished by MgO additions to $Al_2O_3$ or CaO additions to $ThO_2$ (Thorium Oxide or Thoria), as well as other systems.

Ceramic sintering also causes a change in the residual porosity remaining from the interparticle space present in the initial powder compact. This porosity is apparent at the grain boundaries and within the grains themselves. Pores are present mostly at the grain corners since the major porosity occurs there in the powder compact. Pore agglomeration of smaller pores at the moving grain boundary increases the porosity at the grain corners. Some small pores may escape the agglomeration process and remain at the boundary or within the grains.

Development and Control of the Structure

The parameters that control the ultimate grain size and porosity include the calcination temperature and initial crystallite size, sintering time, temperature, initial green strength and the kind and amount of mineralizers used in the hot pressing cycle.

The process of densification during sintering involves several distinct stages leading to the desired final density or porosity. Normally this is the elimination of porosity and maximization of density. For chlorinating electrolytic cells, this obviously is not desired.

A powder compact before firing is composed of individual grains with a separation yielding between 25 and 60 percent volumetric porosity. This parameter may be changed depending on the process used. The final results desired are obtained during firing. The size and shape of the pores are changed, depending on the firing parameters. Accompanying this change of shape and size in most cases is a shrinkage of the overall size. The principle variables that affect the rate and amount of pore-shape change are initial particle size, temperature which actually changes the vapor pressures, and time. Other variables are also present, but affect the results to a much lesser extent.

Since porosity is an important parameter for this application, its characteristics must be noted. Porosity can be characterized by the volume fraction of pores present and their size, shape, and distribution compared with the other phases present. The amount of porosity can vary from 0% to more than 90% of the total volume.

Porosity can be categorized by its relationship to its surrounding phases. Some pores are held completely inside of a continuous grain. These pores are usually not continuous, that is, not connected from one to the next. Pores relating to the grain boundaries are usually not round and are usually continuous. Apparent porosity characterizes pores that are connected to the surface of the material, or open pores. Total porosity includes both open and closed pores. Obviously open pores create the desired porosity which is of interest for this application.

The term permeability is used as a measure of apparent porosity in terms of flow of gas or liquid through the structure. When total porosity reaches about 5%, generally open porosity is eliminated as illustrated in FIG. 4.

Desired parameters for use as a diaphragm in chlorinators include a very fine pore size. In chlorinators using a batch process high permeability is not required. The first material developed for this use had an average pore size of 0.5 microns and a maximum pore size of 1.0 microns with a permeability of 0.8 ml/$cm^2$ hr @ 20° C., 10 m head. Performance was good although the back migration of $OH^-$ ions was higher than desired and a slow buildup of NaOH in the anolite was observed.

An adjustment was made to decrease the maximum pore size to less than 0.5 microns for the average pore size. Permeability was not appreciably decreased. A noticeable decrease in the buildup of sodium hydroxide was accomplished. Final firing parameters were held at 1450° C. for two hours, Initial greenware density was held at about 45% using a 3 micron initial grain size powder.

For use as a diaphragm in a commercial chlorination cell where a continuous flow process is used to add brine and remove the sodium hydroxide/brine mix, the flow is regulated to equal the back migration of hydroxide ions into the anolite. This requires a permeability considerably higher than for a batch processed cell. A reduction in the greenware density by increasing powder particle size and a reduction in the firing temperature should afford the correct parameters.

Manufacturing Process

Although the initial parts were made by slip casting the use of powder pressing, isostatic powder pressing, extrusion forming methods followed by a sintering process modified to yield the same results can be used equally as well.

A description of these manufacturing processes may be noted from "*Ceramics for Advanced Technologies*" Hove, J. E. and Riley, W. C., John Wiley & Sons Inc.

N.Y. 1965. pp. 79–84 and is incorporated herein by reference.

Electrolytic Generation System

The diaphram must be used in conjunction with an anode and a cathode separated by the diaphragm. A cathode emits electrons which pass through the pores of the separator or diaphragm to the anode. The effectiveness of the system depends on many characteristics including, the distance between the anode and the cathode, the surface area of the cathode and anode, the ratio of surface area between the anode and cathode, the porosity of the diaphragm, the concentration of chemicals in the anolite and catholite, the operating temperature and the voltage potential between the anode and cathode.

Analysis and experimentation have shown that a configuration which uses the diaphragm in a cylinder or cup shape with the anode on the inside of the cylinder and the cathode on the outside of the cylinder is most desirable. The radial distance between the anode and cathode is minimized by making the diaphragm as thin as practical and mounting the anode and cathode concentrically as close as possible to it. The area ratio between the anode and cathode should be about 4:1.

Although but one embodiment of the present invention has been illustrated and described, it will be apparent to those skilled in the art that various changes and modifications may be made therein without departing from the spirit of the invention or from the scope of the appended claims.

What is claimed is:

1. An electrolytic cell for generating gaseous chlorine comprising:
   a cathode chamber,
   an anode chamber for containing therein a concentrated aqueous solution of a metallic chloride,
   said anode chamber being at least partially formed of a porous ceramic material,
   an anode mounted in said anode chamber for extending into the aqueous solution when placed therein,
   a cathode mounted in said cathode chamber and being in communication with said anode chamber through pores in said ceramic material,
   means for supplying a DC voltage across said anode and said cathode to produce gaseous chlorine in said anode chamber,
   a conduit extending from the upper end of said anode chamber for discharging gaseous chlorine from said cell, and
   a conduit extending from said cathode chamber for discharging gaseous hydrogen from said cell,
   said ceramic material comprising aluminum oxide and magnesium oxide which has been plastically deformed and then annealed.

2. The electrolytic cell set forth in claim 1 wherein: said ceramic material is permeable to hydrogen gas and substantially impermeable to said brine solution.

3. The electrolytic cell set forth in clam 1 wherein: said ceramic material comprises sintered alumina.

4. The electrolytic cell set forth in claim 1 wherein: said ceramic material has an average pore size of 0.5 microns.

5. The electrolytic cell set forth in claim 4 wherein: the maximum pore size is 1.0 microns with a permeability of 0.8 ml/cm$^2$ hr @ 20° C.

6. The electrolytic cell set forth in claim 1 wherein: said ceramic material comprises a diaphragm of a cylindrical configuration with said anode and cathode being positioned concentrically and in close proximity thereto.

7. The electrolytic cell set forth in claim 1 wherein: said ceramic material comprises a diaphragm of a cylindrical configuration, and said anode and cathode each comprise a ring-shaped configuration concentrically positioned to and in close proximity to said diaphragm.

8. The electrolytic cell set forth in claim 7 wherein: the width of the anode and cathode rings is less than the width of said diaphragm.

9. The electrolytic cell set forth is claim 7 wherein: the area ratio between said anode and cathode is approximately 4 to 1, respectively.

10. The electrolytic cell set forth in claim 7 wherein: said anode chamber comprises a cylindrical configuration, and said diaphragm comprises an integral part of said anode chamber.

11. The electrolytic cell set forth in claim 7 wherein: said anode, cathode and diaphragm are coaxially arranged.

12. An electrolytic cell for generating gaseous chlorine comprising:
   a cathode chamber,
   an anode chamber for containing therein a concentrated aqueous solution of a metallic chloride,
   said anode chamber being at least partially formed of a porous ceramic material,
   an anode mounted in said anode chamber for extending into the aqueous solution when placed therein,
   a cathode mounted in said cathode chamber and being in communication with said anode chamber through pores in said ceramic material,
   means for supplying a DC voltage across said anode and said cathode to produce gaseous chlorine in said anode chamber,
   a conduit extending from the upper end of said anode chamber for discharging gaseous chlorine from said cell, and
   a conduit extending from said cathode chamber for discharging gaseous hydrogen from said cell,
   said ceramic material comprising alumina having a chemical composition of approximately 99.7 percent $Al_2O_3$; 0.1 percent $MgO$; 0.1 percent $Na_2O$ and 0.1 percent of $SiO_2$ and $CaO$.

13. An electrolytic cell for generating gaseous chlorine comprising:
   a cathode chamber,
   an anode chamber for containing therein a concentrated aqueous solution of a metallic chloride,
   said anode chamber being at least partially formed of a porous ceramic material,
   an anode mounted in said anode chamber for extending into the aqueous solution when placed therein,
   a cathode mounted in said cathode chamber and being in communication with said anode chamber through pores in said ceramic material,
   means for supplying a DC voltage across said anode and said cathode to produce gaseous chlorine in said anode chamber,
   a conduit extending from the upper end of said anode chamber for discharging gaseous chlorine from said cell, and
   a conduit extending from said cathode chamber for discharging gaseous hydrogen from said cell,
   said ceramic material comprising magnesia-alumina spinel.

* * * * *